United States Patent

Fukuhara et al.

Patent Number: 5,088,870
Date of Patent: Feb. 18, 1992

[54] METHOD FOR FORMING A TWO CHAMBERED CAN

[75] Inventors: Akio Fukuhara, Kanagawa; Kazuo Iyama, Chiba; Kazuo Suzuki; Ken Iwase, both of Tokyo, all of Japan

[73] Assignee: Daiwa Can Company, Tokyo, Japan

[21] Appl. No.: 447,037

[22] Filed: Dec. 7, 1989

Related U.S. Application Data

[62] Division of Ser. No. 237,249, Aug. 26, 1988.

[30] Foreign Application Priority Data

Aug. 27, 1987 [JP] Japan .......................... 62-129162[U]
Apr. 28, 1988 [JP] Japan ................................ 63-108698

[51] Int. Cl.[5] ...................... B21D 51/26; B21D 51/32
[52] U.S. Cl. ........................................... 413/4; 413/7; 72/348; 72/349
[58] Field of Search ..................... 413/2, 3, 4, 6, 7; 72/349, 348, 708

[56] References Cited

U.S. PATENT DOCUMENTS

| | | | |
|---|---|---|---|
| 2,185,799 | 1/1940 | Blake et al. | 62/4 |
| 2,338,094 | 1/1944 | Calleson et al. | 220/74 |
| 3,802,056 | 4/1974 | Jaeger | 413/2 |
| 3,970,068 | 7/1976 | Sato | 206/219 |

Primary Examiner—Bruce M. Kisliuk
Assistant Examiner—Jack Lavinder

[57] ABSTRACT

A method for forming a two chambered can having a first chamber in a seamless hollow can cylinder with a closed end portion formed by deep drawing a thin aluminium sheet a second chamber defined in a recess which is formed by inversely rolling a part of the can cylinder at the location adjacent to the end wall of the can cylinder to displace the end wall toward the interior of the can cylinder. respective chambers are filled with different contents and are sealingly closed by respective can lids by a double winding up process respectively.

3 Claims, 4 Drawing Sheets

U.S. Patent     Feb. 18, 1992     Sheet 1 of 4     5,088,870
Fig. 1
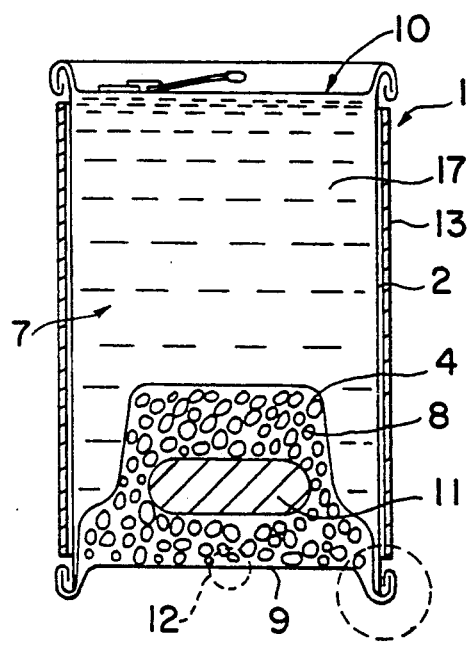
Fig. 2
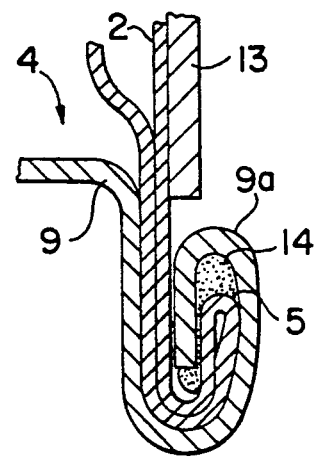
Fig. 3 (A)    Fig. 3 (B)    Fig. 3 (C)    Fig. 3 (D)
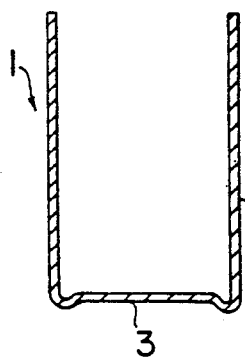 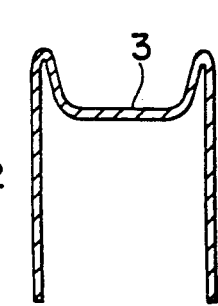 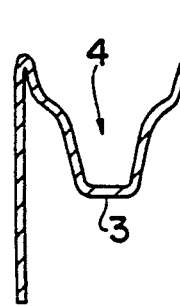 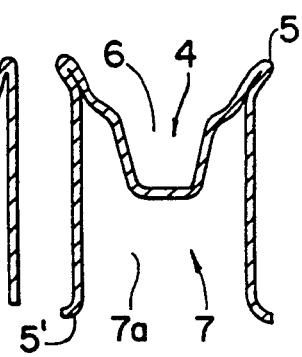
Fig. 4
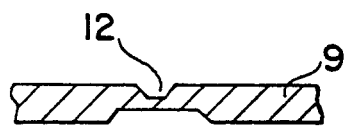
Fig. 5
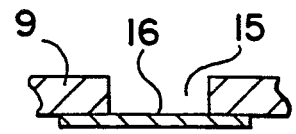

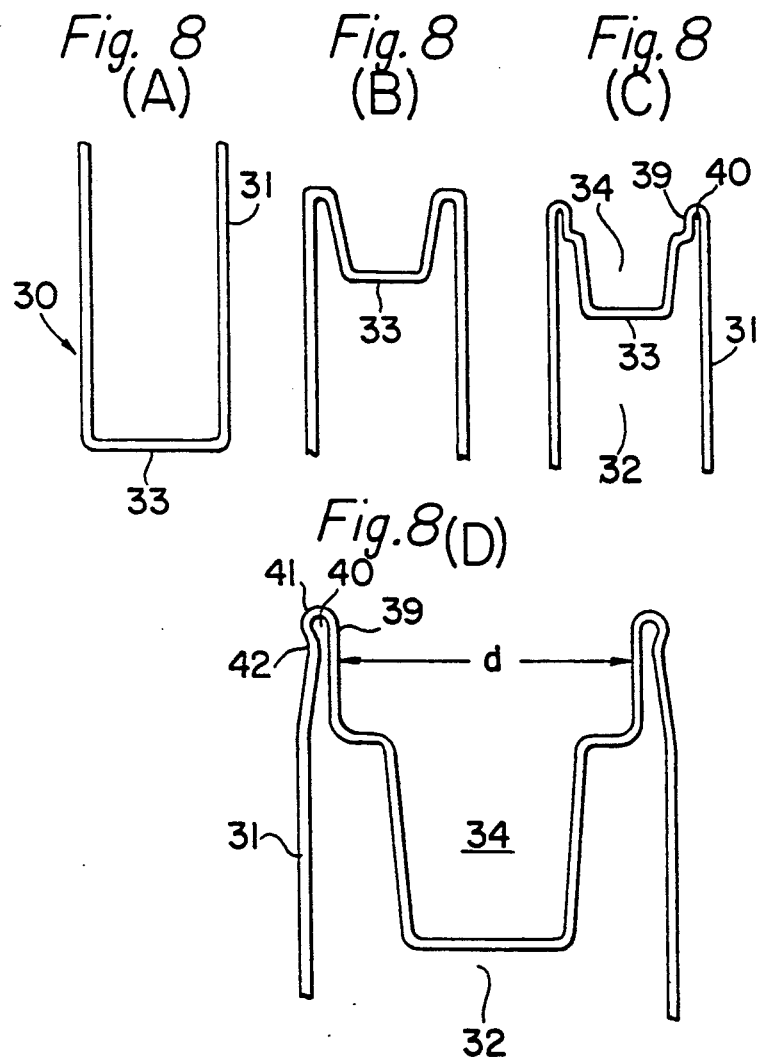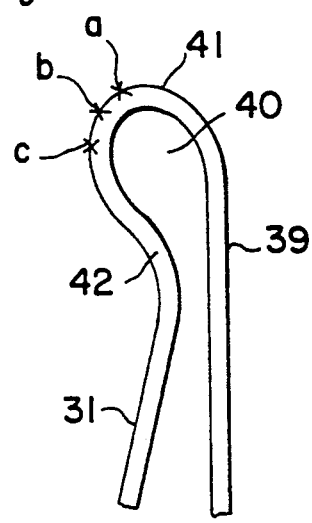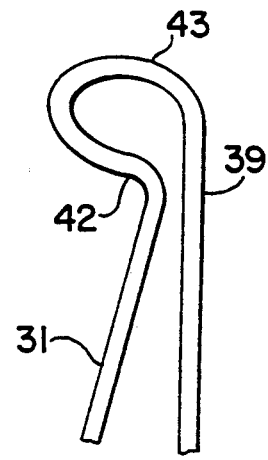

METHOD FOR FORMING A TWO CHAMBERED CAN

This is a divisional of co-pending application Ser. No. 07/237,249 filed on Aug. 26, 1988.

FIELD OF THE INVENTION

This invention relates to a method for forming a two chambered can wherein the interior of the can is partitioned into a first chamber for receiving therein food, beverage or the like and a second chamber for receiving therein a cooling or heat generating agent.

DESCRIPTION OF THE PRIOR ART

A conventional two chambered can or container such as a container having a first chamber receiving therein a beverage and having on the bottom side of the first chamber a second chamber receiving therein a heat generating agent for heating the beverage is usually formed by separately fabricating generally cup shaped first and second can portions defining respectively the first and second chambers therein, fitting the second can portion with the first can portion, and connecting the first and second can portions together with a can lid by utilizing a double winding up or seaming process.

The prior art two chambered can is formed of two independent can portions and a can lid by a double seaming process, thus, the fabricating process is complicated and, the winding up process is unreliable.

Japanese Utility Model Public Disclosure (Kokai) No. 91160/1987 relates to an improvement, wherein the first paper portion for receiving therein a beverage is sealingly connected to the second can portion by the double seaming process; the heat generating agent is received in the second can portion and, thereafter, the second can portion is sealingly connected with a lid by an adhesive agent or welding process. In this improvement, sealing can be improved, but the fabricating process is complicated and the cost is increased. The can lid may be attached by a bonding agent, however, it is difficult to detect the soundness of and bonding, the deterioration of the bonding agent over a long period is inevitable. In addition, the can lid may open due to vibration during transportation and the like which will cause the the heating agent to leak.

SUMMARY OF THE INVENTION

An object of the present invention is to provide a two chambered can separately receiving therein a beverage and a heat generating agent.

Another object of the invention is to provide a two chambered can so as to prevent the lid from falling off or the heat generating agent from leaking due to an impact shock or to vibrations caused during storage or transportation.

A further object of the invention is to provide a method for forming a two chambered can using a double winding up process in the flange portion of the can.

According to the invention, there is provided a two chambered can comprising a first receiving chamber defined in a seamless can cylinder having an open end and a closed end and being formed by deep drawing or drawing with ironing a metal sheet, preferably a thin aluminium sheet, a second receiving chamber defined in a recess which is formed by rolling inversely a part of the can cylinder at the location adjacent to the closed end of the can cylinder such that the end wall of the can cylinder will displace toward the interior of the can cylinder thereby forming the recess projecting into the can cylinder, a can lid connected sealingly with the open end of the first receiving chamber by double winding up process thereby sealing the first chamber, and another can lid connected sealing with the open end of the second receiving chamber by double winding up process thereby sealing the second chamer, said first and second chambers being filled with different contents.

The two chambered can according to the invention has the second chamber on the interior of the seamless can cylinder and with the end wall of the can cylinder being displaced toward the open end of the can cylinder by rolling inversely a part of the cylindrical wall of the can cylinder (integrally formed), and the first chamber in the interior of the can cylinder, with the first and second chambers being sealed respectively by respective lids, thus, it is possible to reliably prevent leakage between the first and second chambers.

Further, according to the invention, a method for forming a seal portion between a can lid and the open edge of a second chamber of a two chambered can is provided. The two chambered can has a first chamber defined in a seamless can cylinder and is formed integrally therewith and has a closed end. The second chamber is defined by a recess which is formed outside of the can cylinder by rolling inversely a part of the can cylinder at the location adjacent to the closed end wall of the can cylinder such that the end wall of the can cylinder will displace toward the interior of the can cylinder. The method of forming the two chambered can further include steps of forming a generally radially outward extending and then axially outward extending flange portion of the open end of the second chamber so that the contacts of the axially outward extending flange portion and the cylindrical wall, mounting the can lid on the radially outward extending flange, and sealing the can lid by double winding up the circumference of the can lid and the radially outward extending flange by utilizing a seamer.

Preferably, the step forming the radially outward extending and then axially outward extending flange portion on the open end of the second chamber includes forming an annular space between the axially outward extending flange and corresponding portion of the cylindrical wall of the can cylinder at the axially outward end.

The annular space effectively prevents any sharp edge between the cylindrical wall of the can cylinder and the axially extending flange of the second chamber so that cracks and the like can be prevented during the double winding up process for sealing the second chamber with the can lid.

BRIEF DESCRIPTION OF THE DRAWNIGS

Further objects and advantages of the invention will become apparent from the following description taken in conjunction with the attached drawings exemplifying some preferred embodiments of the invention, in which:

FIG. 1 is a longitudinal sectional view showing one embodiment of the present invention;

FIG. 2 is an enlarged view of a portion of FIG. 1;

FIG. 3 is an explanatory view showing steps forming a seamless can cylinder having first and second chambers;

FIG. 4 is an enlarged sectional view of a portion of a can lid;

FIG. 5 is a view similar of FIG. 4 but showing a modified form;

FIG. 8 through FIG. 10 are views showing forming steps according to the invention, wherein:

Figure 11:
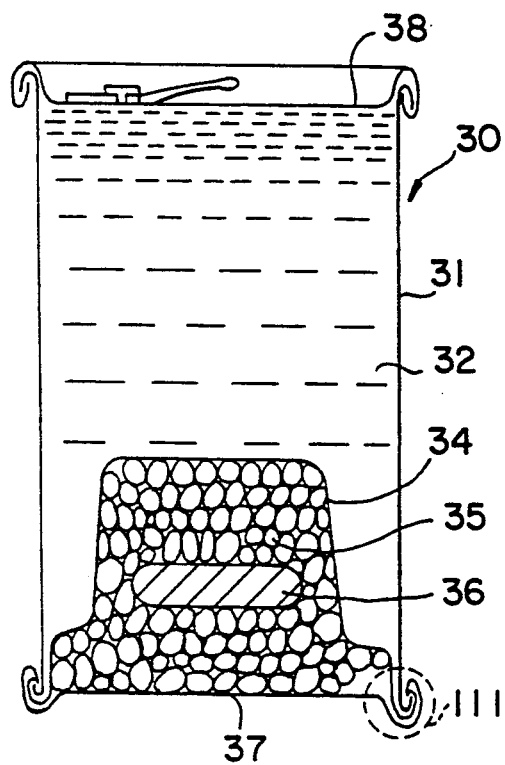

FIG. 8(A) through FIG. 8(D) are longitudinal sectional view showing the forming process of the seamless can cylinder;

FIG. 9(A) and FIG. 9(B) are enlarged sectional views of axial end portions of the seamless can cylinder;

FIG. 10(A) through FIG. 10(C) are views showing winding up process;

FIG. 11 is a longitudinal sectional view of a two chambered can; and

Figure 12:
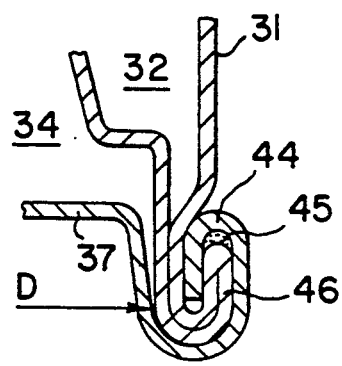

FIG. 12 is an enlarged sectional view of a portion shown by broken line in FIG. 11.

DETAILED DESCRIPTION OF PREFERRED EMBODIMENTS

FIG. 1 is a longitudinal sectional view of a beverage can of two chambered construction according to the present invention. The can comprises a seamless can cylinder or seamless hollow cylinder 1 forming the main body of the can, and the can cylinder 1 includes a cylindrical wall 2 a defining a first chamber 7 and a portion integrally projecting from one end of the cylinder wall 2 toward the inside which defines a second chamber 4 by folding the end of the cylindrical wall 2. The second chamber 4 receives therein a heat generating agent 8 and a sealed bag 11 receiving a reaction agent therein. The first chamber 2a is filled with contents such as a beverage and is sealingly closed by a top lid 10 such as a known easy-opening closure, and the second chamber 4 is sealingly closed by a bottom lid 9 the bottom lid 9 is connected by double winding up or seaming process to the open end or folded flange outer of the second chamber 4.

FIG. 2 is an enlarged cross-sectional view of the double winding up or seaming portion of the bottom lid 9 to the open end or folded flange of the second chamber 4. FIG. 3 shows the steps for forming the seamless hollow can cylinder 1. As shown in FIG. 3(A), the seamless hollow can cylinder 1 is formed by deep drawing or drawing and ironing a thin plate or sheet of aluminium alloy such that the can cylinder 1 consists of a cylindrical wall 2 and continuous bottom wall 3 integral with the cylindrical wall 2 and closing one end of the hollow cylinder 1. Preferably, the thickness of the aluminium alloy sheet is not smaller than 0.18 mm. As shown in FIG. 3(A) and FIG. 3(C), the bottom wall 3 is drawn deeply with 2 or 3 steps so as to form the second chamber 4, which is defined by a wall portion projecting inversely toward the interior of the hollow can cylinder 1 to form a recess inside of the hollow can cylinder 1.

As shown in FIG. 3(D), the upper and lower open portions 6, 7 of the hollow cylinder 1 are formed to define a folded flange 5 and a flange 5' at each end of said open portions 6, 7 a respectively so as to permit the double winding up process. Next, the heat generating agent 8 and the sealed bag 11 receiving the reaction agent therein are received in the second chamber 4, and a bottom lid 9 is mounted on the folder flange 5 with a suitable seal member such as a rubber ring 14 being interposed therebetween. The can bottom lid 9 and the folded flange 5 are integrally and sealingly connected by double winding up process.

As shown in FIG. 2, the wound up portion of the can bottom lid 9 consists of the folded flange 5 being wound by the circumferential portion of the can bottom lid 9 with the rubber ring 14 interposed between the distal end of the folded flange 5 and a part 9a of the can bottom lid 9, thus, the cylindrical wall 2 of the hollow can cylinder 1 is sealingly and reliably secured to the can bottom lid 9.

In the embodiment, the second chamber 4 receives a heat generating agent 8 and a reaction agent in the sealed bag 11 but the second chamber 4 may receive therein a suitable cooling agent and reaction agent as known to those skilled in the art.

The heat generating agent may consist of such material as CaO added by calcined substance such as $MgCO_3$ or $CaCO_3$. A mixture of nitrate, ammonium salt and the may be utilized as a cooling agent. The reaction agent such as, for example, water or a water solution of natrium (sodium) chloride is enclosed in a sealed bag and received in the second chamber separated from the heat generating or cooling agent so that the heat generating or cooling agent acts at desired time in response to the reaction agent being released.

The hollow interior of the can cylinder 1 defining the first chamber 7 is filled with suitable a desired content such as a beverage 17 and the like, and the open end defining the flange 5' is cover by the top can lid 10 and the can top lid 10 is secured to the flange 5' by double winding up or seaming process. In FIG. 1, the cylindrical wall 2 of the hollow can cylinder 1 is covered by a heat insulating material 13.

In using the can shown in FIG. 1, the sealed bag 11 is ruptured by means such as an actuating pin (not shown) so as to cause the reaction agent to react with the heat generating agent 8 thereby heating the beverage 17. When the beverage is heated to a suitable temperature, the can top lid 10 is opened and the beverage 17 is ready to drink.

The heat insulating material 13 permits the can to be handled by bare hands.

Preferably, a thin portion 12 is formed in the can bottom lid 9 as shown in FIG. 4 so that the actuating pin can easily be pierced through the can bottom lid 9 and into the sealed bag 11. Preferably, the actuating pin is mounted on the face of the can bottom lid 9 by a suitable mounting member formed such as, for example from a synthetic resin.

FIG. 5 shows another embodiment of the can bottom lid 9 which has a permanent opening 15 for inserting therethrough the actuating pin. The opening 15 is normally closed by a cover sheet 16. The sheet 16 is peeled off to expose the opening 15 by using the actuating pin.

The can according to the invention may receive contents other than a beverage if so desired.

Figure 6:
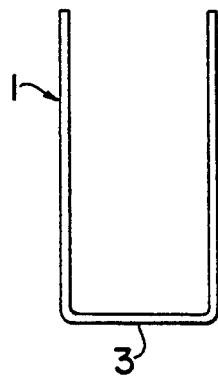
FIG. 6 and FIG. 7 are explanatory views showing steps forming the seamless can cylinders, respectively.
Figure 6:
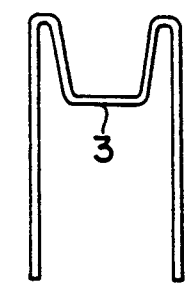
Figure 6:
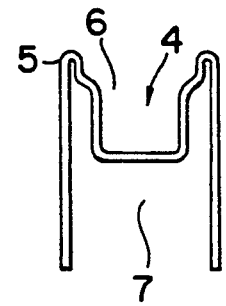

The forming process according to the invention will be described in detail with reference to FIGS. 6 and 7.

Figure 6D:
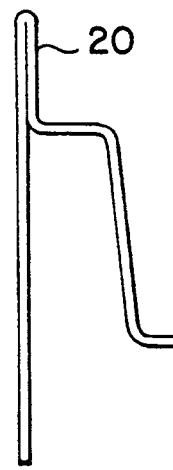
Figure 6E:
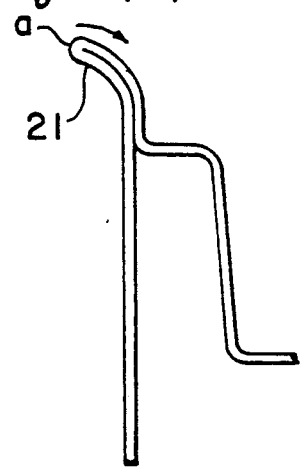

As shown in FIG. 6(A), the seamless hollow can cylinder 1 is formed by deep drawing a thin sheet of aluminium alloy so as to define the cylindrical wall 2 and the continuous bottom wall 3 integral with the cylindrical wall. The bottom wall 3 is drawn deeply toward the interior of the hollow can cylinder 1 as shown in FIG. 6(B). Then, the bottom wall 3 is further drawn deeply so as to form radially outward extending flange 5 on the open end portion 6 of the second chamber 4 as shown in FIG. 6(C). It will be noted that the axially extending flange portion of the top wall of the second chamber 4 formed from the bottom wall 3 generally contacts with the corresponding portion of the cylindrical wall 2 as shown in FIG. 6(D) to constitute an overlapping portion 20. The overlapping or folded portion 20 is bent radially outward by using a flanger so as to form a flange 21 as shown in FIG. 6(E).

In performing the forming process, there is a tendency that cracks may be present in the overlapping portion 20 especially an end portion 9.

Figure 7A:
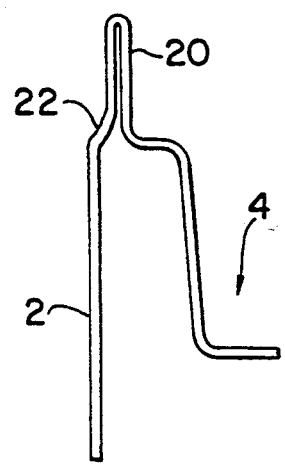
Figure 7B:
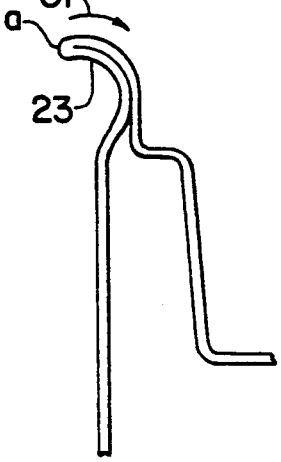

FIG. 7 shows a countermeasure wherein, a part 22 of the cylindrical wall 2 is necked in as shown in FIG. 7(A) in forming the axially outward extending flange on the open end of the second chamber 4 and, thereafter, a flange portion 23 is formed as shown in FIG. 7(B). However, in performing the double winding up process on the flange portion 23 together with the can bottom lid, the distal end a of the flange portion 23 is pulled in the direction of the arrow line 101 which tends to generate cracks at the end a or to decrease the reliability of the seal.

FIG. 8 through FIG. 12 show a modified process an alternative embodiment of the invention shown in FIGS. 8–12 can solve the problem of cracks at the end a as illustrated and explained in connection with FIGS. 6(E) and 7(B) even if the method is carried out at normal production speed.

FIG. 11 is a longitudinal sectional view of a beverage can of a two chambered construction produced by the process shown in FIG. 8. This can comprises a seamless hollow can cylinder or seamless hollow can cylinder 30 with a bottom portion integrally formed thereto as the main body of the can. The hollow can cylinder 30 forms a first chamber 32 and a second chamer 34 therein. The second chamber 34 is formed from a recess which projects from a closed end wall bottom portion 33 (see FIGS. 8(A), 8(B)) at one end of the cylindrical wall 31 in the cylinder 30 toward the inside thereof so as to form the recess, from which the second chamber 34 is defined, at the outside surface of the bottom portion 33.

The second chamber 34 received therein a heat generating agent 35 and a sealed bag 36 receiving a reaction agent therein and both the generating and reaction agents are sealingly closed by a lid of can bottom lid 37 with a double seaming process. The first chamber 32 filled may be with contents such as a beverage and is double seamed with and sealingly closed with a known easy-open can lid 38.

FIG. 12 is a fragment enlarges cross-sectional view of the double seaming portion of the second chamber 34 as shown by the broken line 111 in FIG. 11. FIG. 8 shows forming steps of the double seaming portion.

As shown in FIG. 8(A) a seamless hollow can cylinder having a closed end wall 33 said end wall is formed by deep drawing process. The thickness of aluminum alloy sheet is preferably at least 0.18 mm. The hollow can cylinder is placed upside down and partly reverse drawn and the end wall portion is drawn deeply, as shown in FIGS. 8(B) and 8(C), to form a second chamber 34 which projects into the interior of the hollow can cylinder 30. There is formed an annular clearance 40 defined between the axially extending side wall 39 of the second chamber 34, the cylindrical wall 31 and an end portion connecting said side wall 39 and wall 31 as shown in FIG. 8(D). When the diameter of the can cylinder 30 is 60–70 mm, and the clearance space 40 is preferably 1.5–4.5 mm, and more preferably, 1.5–3.0 mm. It will be understood that, in FIG. 8(D) the side wall 39 does not contact with the cylindrical wall 42, but, according to usual deep drawing process the side wall 39 may contact the wall 42 and it is essential, according to the preferred embodiment of the invention, that the annular space 40 is formed at the distal ends of mutually overlapping or folded portions 39 and 42 to provide a swelled flange.

FIG. 9(A) is an enlarged view of a portion of FIG. 8(D). To form the clearance 40, the axially outer end portion of the wall 31 is rolled to form the recessed portion 42. To form the clearance 40, the rolling process is effected at the location slightly downward of the outer end and in the radially inward direction. To effect the double winding up process more reliably and easily, it is preferable to displace, as shown in FIG. 9(B), the axially outer end 41 in the direction radially outward so as to form a somewhat flattened portion 43.

An agent 35 such as a heat generating agent and an enclosure 36 sealingly receiving a reaction agent are mounted in the second chamber 34 as shown in FIG. 11. A can bottom lid 37 is mounted to cover the opening of the second chamber 34 and, a flange portion 44 of the can bottom lid 37 having a curled outer edge and the outer end 41 of the hollow can cylinder 1 are secured by double winding up process utilizing a seaming machine.

In assembling the can bottom lid 37 with the hollow can cylinder 1 the diameter D of the can bottom lid 37 shown in FIG. 12 is preferably larger than the diameter d of the flange portion 39 of the second chamber 34 shown in FIG. 8(D), because the portion 39 is expanded during the winding up process which enables the portion 39 to be tightly contacted with the cylindrical wall portion 31.

FIG. 10(A) through FIG. 10(C) are sectional views to show the winding up process. The open end of the second chamber 34 formed into the configuration of FIG. 9(A) or FIG. 9(B) is covered by the can bottom lid 37 shown in broken lines, and a seamer or a seaming machine is applied thereto.

Figure 10:
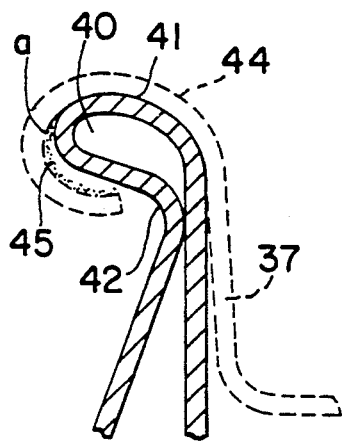
Figure 10:
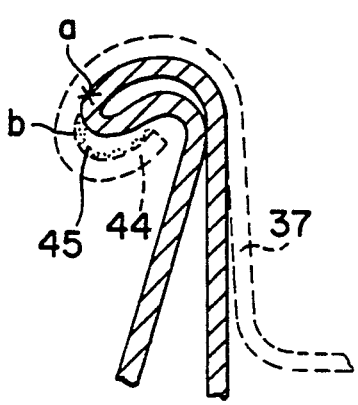
Figure 10:
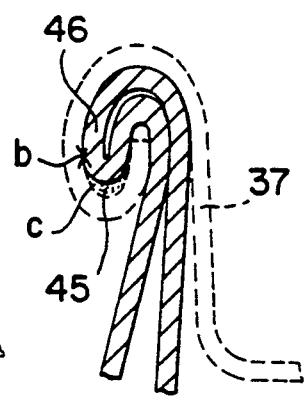

FIG. 10(A) shows the condition where a first winding up roll is applied. Shown at 45 in the drawing is a sealant such as a rubber and the like applied on the inner surface of the flange portion 44 of the can bottom lid 37. The portions a, b and c shown in FIG. 9(A) are pulled in a radially inward direction when the portion 41 is covered by and bent by the flange portion 44 of the can bottom lid 37 as shown in FIG. 10, but since the portions a, b and c are arranged on the accurate line the material deforms plastically and displaces inward. At the least stage of the first winding up roll, as shown in FIG. 10(B), the tip end of the bending coincides with the point b, and point a is located inward of point b.

A second winding up roll is then applied. The point b has a somewhat rounded form, thus, the material plastically deforms to displace radially inward end at the end of the second winding up roll as shown in FIG. 10(C), the point c is located at the tip end of bending and a double bent winding up portion 46 is formed. Accordingly, the material is plastically deformed until the formation of the winding up portion 46, therefore, it is possible to prevent cracks or insufficient winding up operation.

As shown in FIG. 12, the overlapping portion 46 between the cylindrical wall of the can cylinder and the side wall of the second chamber 34 is wrappingly covered by the flange portion 44 of the can bottom lid 37 having the sealant 45 applied thereon, and which are connected tightly by the winding up process, thus, the chamber 34 is reliably sealed by the can bottom lid 37.

According to the invention, the second receiving chamber projecting toward the interior of a seamless can cylinder is formed of a recess which is defined by inversely rolling a closed end wall of the can cylinder, and the second chamber is sealed by double winding up the circumferential edges of a can bottom lid and the open end of the second chamber, thus, the second chamber can be reliably sealed from both the outside of the can and the first chamber which is defined in the interior of the can cylinder and which first chamber is sealed by utilizing a can top lid. Therefore, it is possible to prevent leakage between the two chambers and between the outside. Further, it is possible to reduce the number of parts.

According to the invention, the cylindrical wall of the can cylinder, the side wall and the axially extending flange portion of the second chamber which has been inversely bent from and integrally connected to the cylindrical wall of the can cylinder, and the flange portion of the can lid are connected together by double winding up or seaming process, and the material of the can cylinder can be, during a substantial portion of the winding up process, plastically deformed, so that cracks or other deficiencies of the wound up or seamed portion are reliably prevented. This invention is limited only by claims.

What is claimed is:

1. A method of forming a two chambered can having a first chamber and a second chamber axially aligned with one another, said first chamber defined by a seamless hollow can cylinder having a cylindrical wall and having an integrally formed end wall closing one end of the cylindrical wall, said second chamber being defined by a recess formed opposite to the said first chamber; said method comprising the following steps:

forming the seamless hollow can cylinder as the first chamber by drawing and ironing a thin sheet of aluminum alloy such that the can cylinder consists of a cylindrical wall and an integral end wall closing one end of that cylindrical wall, reverse-drawing a part of the can cylinder such that the end wall is displaced toward the interior of the cylindrical wall to form a recess as said second chamber, forming a generally axially and radially outwardly extending swelled flange portion on the open end of the second chamber by depressing an annular portion of the cylindrical wall adjacent to the open end of the second chamber, mounting a can lid on the swelled flange portion, displacing the swelled flange portion radially outwardly to flatten said swelled portion, and double winding up a flange of the can lid over the flattened flange portion by utilizing a seamer.

2. A method according to claim 1 wherein the step of displacing the swelled flange portion radially outwardly to flatten said swelled portion is followed by the step of providing a sealant material between an inside face of the can lid and an outer surface of the can.

3. A method according to claim 1 wherein said step of double winding a flange of the can lid over the flattened flange portion creates a joint that includes at least two layers of the can lid and four layers of the can.

* * * * *